(No Model.)

G. L. CRANDAL.
CARRIAGE JOINT RIVET.

No. 327,385. Patented Sept. 29, 1885.

Witnesses.
C. E. Titchener
N. H. Short

Inventor.
Geo. L. Crandal
By Chas. M. Stone
Atty

UNITED STATES PATENT OFFICE.

GEORGE L. CRANDAL, OF BINGHAMTON, NEW YORK.

CARRIAGE-JOINT RIVET.

SPECIFICATION forming part of Letters Patent No. 327,385, dated September 29, 1885.

Application filed July 8, 1885. (No model.)

*To all whom it may concern:*

Be it known that I, GEORGE L. CRANDAL, a citizen of the United States, residing at Binghamton, in the county of Broome and State of New York, have invented a new and useful Improvement in Carriage-Joint Rivets, of which the following is a specification.

Carriage-joint rivets as usually made are quite expensive, the ornamental top or cap and rivet being joined and held together by solder.

The object of my invention is to furnish a carriage-joint rivet which is practical and inexpensive.

Figure 2:
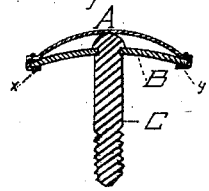
Figure 1:
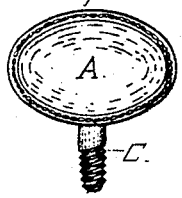
Figure 4:
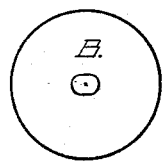
Figure 3:
Figure 5:
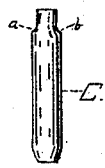
Figure 6:
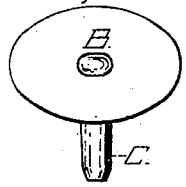

In the drawings, Figure 1 represents a carriage-joint rivet embracing my invention. Fig. 2 represents a sectional view of the same. Fig. 3 represents a sectional view of the metal cap A. Fig. 5 represents an unthreaded or plain rivet, C. Fig. 4 represents a piece of sheet iron or metal, B, made of such size and shape that it will fit inside of the cap A, and having a hole cut out in the center corresponding in shape and size with the end of the rivet C. The end of the rivet C, after being passed through the opening in the piece of metal B, is struck or headed down in suitable dies. The shoulders *a b* on the rivet C form a bearing against the under side of the metal plate B, and when the end of the rivet has been headed down, the metal plate B and rivet C are held together, as shown in Fig. 6. The ornamental cap A is next secured in place by having its edges closed down over the outer edge of the metal plate B, as shown at *x y*, Fig. 2, and when this operation is performed the three pieces A, B, and C, of which the joint-rivet is composed, are held firmly and securely together.

The head of the rivet C, I prefer to make of a sufficient size to reach up to and form a support for the center of the cap A.

Instead of the shoulders *a b* on the rivet C, a bearing can be formed by swelling out the rivet C a little just under the metal plate B by means of suitable dies at the same time the end of the rivet C is being headed down. When the bearing against the under side of the metal plate B has been formed on the rivet C, and the end of the rivet C has been headed down on the upper side of the plate B, the rivet C is prevented from moving out of place in either direction through the metal plate B. I prefer, also, to make the hole in the metal plate B and the end of the rivet C somewhat irregular in shape in order to prevent the rivet C from ever turning around in the plate B.

What I claim as my invention, and desire to secure by Letters Patent, is—

The carriage-joint rivet composed of the metal cap A, rivet C, and metal plate B, substantially as shown and described.

GEO. L. CRANDAL.

Witnesses:
 CHARLES E. TITCHENER,
 NATHAN H. SHORT.